Jan. 26, 1937.   R. W. KRITZER ET AL   2,068,955
REFRIGERATING COIL
Filed April 4, 1935

Inventors:
Richard W. Kritzer
Anthony F. Hoesel

Patented Jan. 26, 1937

2,068,955

UNITED STATES PATENT OFFICE 2,068,955

REFRIGERATING COIL

Richard W. Kritzer and Anthony F. Hoesel, Chicago, Ill.

Application April 4, 1935, Serial No. 14,668

3 Claims. (Cl. 257—255)

This application is related to our joint application Serial Number 758,065 filed December 18, 1934, for Conduit for the circulation of refrigerants.

Refrigeration heat transfer apparatus, prior to the advent of extended surface conduits, which are now commonly termed fin coils, was mainly fabricated by nesting parallel conduit courses, joined by return bends or otherwise, to provide a circuit for the circulated refrigerant. The heat absorption capacity, of these conduits, was necessarily low per given unit of length, because the external surface of the conduit also was low per the given unit of length. Under these conditions, very little could be done to increase the heat transfer efficiency, because even with a very small amount of refrigerant liquid wetted surface at the bottom of the conduit internal wall, the heat absorption capacity, of this wetted surface, was sufficient to absorb practically all of the heat passing through the conduit wall.

With the advent of fin coils, the primary outside surface of the conduit, per given unit of length, was increased by the addition of secondary surface in the form of fins in either soldered or frictional thermal contact therewith.

Whereas, the surface of the original conduits, per given unit of length, had a heat absorption capacity of say 1, the same conduit, when finned and of the same length, in many cases, had the heat absorption capacity increased to 15 and over.

Obviously, if the heat absorption capacity is increased, the rate of vaporization of the refrigerant liquid must increase proportionately, and, therefore, the ebullition of the refrigerant liquid becomes rather violent, tending to force globules of refrigerant liquid into the vapor stream passing through the conduit. Due to the high velocity of the vapor passage, the entrained liquid tends to be carried out of the coil with the vapor of the vaporized liquid.

The majority of fin coils are fed with refrigerant subject to the control of thermostatically operated expansion valves, which tend to feed refrigerant, to the fin coil, at such rates as to maintain a constant condition of superheat of the refrigerant vapor issuing from the coil.

Whenever the vapor, issuing from the coil, contains entrained liquid, the thermostatically controlled expansion valve cuts down the rate of refrigerant liquid flow to that point, where the vapor again becomes superheated. These opposing conditions result in the flow of refrigerant liquid being so restricted as to wet only a portion of the conduit internal walls and thereby cut down the maximum possible heat transfer.

One object of our invention is to increase the heat transfer of finned type cooling units and like apparatus.

Another object of our invention is to utilize the temperature-pressure characteristics of a refrigerant in conjunction with the centrifugal force generated by whirling the refrigerant liquid in its passage through a conduit, whereby ebullition, at the conduit inner wall, is eliminated.

Referring to the drawing.

Figure 1:
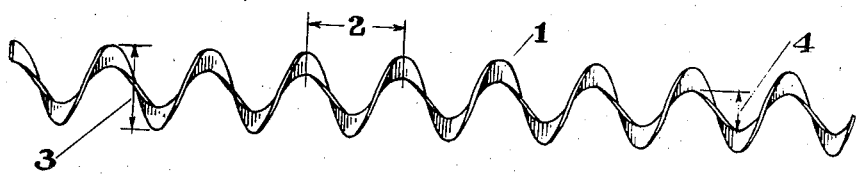
Figure 1 is a view of a spiral ribbon used in the invention.

In Figure 1, a spiral ribbon 1 has a pitch 2 and an outside diameter 3 and inside open passage of diameter 4.

Figure 2:
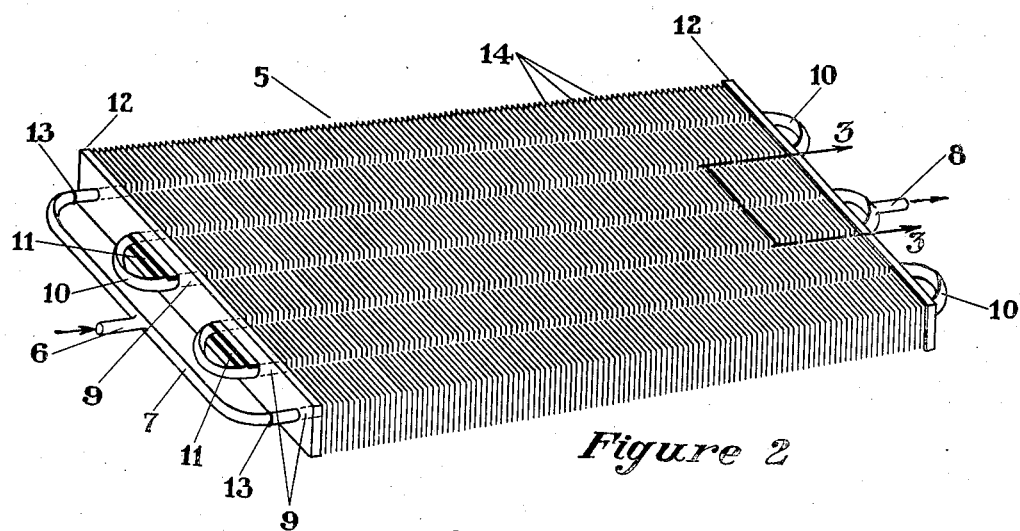
Figure 2 is a view of a fin coil employing the invention.
Figure 3:
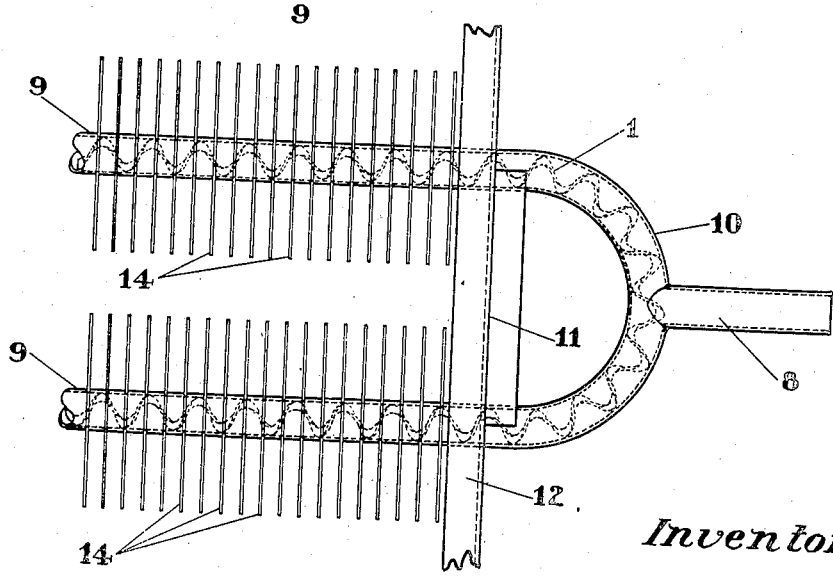
Figure 3 is a plan view of a portion of Figure 2 enclosed by the line 3—3 of Figure 2.

In Figures 2 and 3, the fin coil 5 is comprised of a refrigerant fluid inlet conduit 6 in communication with a manifold 7, which allows simultaneous feeding of refrigerant to both the right and left-hand sections into which the fin coil 5 is divided. Both sections have a common outlet 8. Each of the sections is comprised of conduit parallel reaches 9, joined by return bends 10 making a series conduit circuit for each section. Each of the return bends 10 projects through a slot 11 in an end plate 12, which serves to maintain the alignment of the several parallel reaches 9. The manifold 7 is generally welded to the tubes 9 as at 13 after the end plates 12 are assembled upon the sections.

Upon the various conduit parallel reaches 9, and between the end plates 12, a multiplicity of rectangular fin plates 14 are mounted in spaced relationship to each other and in thermal contact with the parallel reaches 9.

Inside the various conduit parallel reaches 9 and the return bends 10, a spiral ribbon 1, as shown in Figure 1, is placed. The spiral ribbon 1 has an outside diameter 3, which, in its free state, is slightly greater than that of the internal diameter of the conduit, into which it is threaded, prior to the forming of the return bends. The outer edges of the spiral ribbon 1 have a frictional thermal contact with the internal walls of the conduit.

We wish to call particular attention to the fact of the cooling unit 5 having a plurality of series circuits, although having a single refrigerant inlet and outlet. A spiral ribbon, such as in Figure 1, especially if of appreciable width and having a comparatively narrow pitch, introduces a considerable pressure drop between the inlet and outlet of a circuit, unless the length of the single circuit is kept within limits. By manifolding fin coils of this type, we are enabled to dispense with a plurality of thermostatically controlled expansion valves, each of which generally connects to a single refrigerant circuit.

Having described the component parts of the invention, we shall now describe its operation.

The refrigerants generally employed in fin coils are of the volatile class, having a definite pressure at a definite temperature. The refrigerating cycle comprises the vaporization of refrigerant liquid fed to the fin coil, the exhausting of the vapor, by means of compressor, which forces the vapor into a condenser, where the vapor becomes liquefied, in which state it is fed to the coil. Between the condenser and the fin coil, some throttling means, such as the aforementioned thermostatically controlled expansion valve, is placed for the purpose of maintaining the necessary reduced pressure, in the cooling coil, whereby the refrigerant is in a condition to absorb the heat from the cooling coil surroundings.

Immediately at the throttling means, and prior to its passage therethrough, the refrigerant is wholly in its liquid phase. Immediately after the refrigerant's passage through the throttling means and into the cooling unit, the refrigerant is partly in a liquid phase and partly in a vapor phase, the percentage of vaporization being dependent upon the temperature difference of the refrigerant fluid temperatures prior to and subsequent to its passage through the cooling unit, the refrigerant is continuously decreasing its liquid phase and increasing its vapor phase, which results in an increased flow velocity towards the cooling unit conduit outlet.

It will be noticed in Figures 1, 2 and 3, that the spiral baffling is of an appreciable depth, whereby the central clear passageway areas, indicated at 4 in Figure 1, are materially reduced as compared to the total internal area of the conduit without this spiral baffling. This depth of the spiral baffling imparts properties, to the circulating refrigerant, which are entirely absent in a conduit having spiral grooves of comparatively shallow depth similar to the rifling of a gun barrel, etc.

If we employ shallow grooves comparable to gun barrel rifling, we find that their influence is not directly carried out into the vapor stream, which occupies a central position within the conduit, due to the whirling action of the refrigerant liquid making the liquid hug the internal walls of the conduit. We have also found that even if there should be no liquid near the outlet end of the conduit, that if the vapor itself is supersaturated, a shallow baffling will not centrifuge the entrained liquid from the flowing vapor. This is probably due to the fact that, in the center of the conduit, a practically straight line flow exists, or, if some rotation of the vapor occurs, it is quantitatively insufficient to produce a sufficient centrifuging action.

With the deep baffles, which we contemplate using, portions of the same extend inwardly from the conduit walls and beyond the normal depth of refrigerant liquid hugging the internal walls of the conduit, whereby the vapor impinges directly against these baffles and is made to assume a flow path substantially equivalent to that of the helical path of the baffle.

The above description relates to the same manner of vaporization of the refrigerant fluid in the conduit, as would occur in any ordinary system; namely, the passage of heat through the conduit walls ebullates the refrigerant liquid immediately adjacent thereto. The formation of vapor bubbles at the conduit wall results in an alternate drying and wetting of the wall surfaces where the ebullition takes place.

The alternate drying and wetting of the conduit inner wall surface must result in a decreased total wetted time.

Now, for the ultimate possible highest efficiency of heat transfer, we propose to eliminate the ebullition at the inner wall surface and its consequential periodical drying of multitudinous points, of small area each, but an appreciable area in the aggregate, and thereby preserve an unbroken film of refrigerant at the conduit inner wall surface. It is our intention to transfer the heat from the outside of the conduit wall, through the conduit wall and also through the refrigerant liquid film, into the central vapor space, without any ebullition taking place in the liquid film at the wall. The ebullition, if any, occurring only on the surface film of the refrigerant liquid at its inner periphery.

Assuming a long length of conduit such as in Figure 2, if the proportions are correct for the flow velocity, then the inner wall of the conduit will have a spirally rotating liquid film, which, because of the decreasing liquid phase and increasing vapor phase of the refrigerant in its passage from the inlet to the outlet ends of the conduit, results in an increasing area for the generated vapor, because the liquid film is constantly decreasing in thickness toward the outlet end. If the proper proportions are used for the spiral passage, then the refrigerant liquid, due to centrifugal force, will press against the internal walls of the conduit with an equal pressure throughout the wetted length of the conduit.

It is well known, in the refrigerating art, that any volatile refrigerant, in its liquid phase, can vaporize only whenever its pressure is reduced below that of its equivalent temperature pressure; at all higher pressures, the refrigerant remains in the liquid phase.

To illustrate a concrete example, we shall assume a conduit, in which methyl chloride is used as the circulating refrigerant. The vapor pressure shall be 35 pounds Abs. corresponding to a temperature of 30 degrees Fahrenheit. Obviously, since heat can only flow because of temperature difference, the internal walls of the conduit must be at a greater temperature than 30 degrees Fahrenheit. To simplify the illustration we shall assume that the internal walls are at 31 degrees Fahrenheit, which corresponds to approximately 35.8 pounds Abs.

If we rotate the refrigerant liquid at a sufficient rate of speed, we have an increment of centrifugal pressure, which added to the vapor pressure of the refrigerant, results in the refrigerant liquid pressing against the internal walls of the conduit with a pressure in excess of 35.8 pounds. Since vaporization cannot occur unless the pressure upon the liquid is less than the equivalent temperature pressure, there is an entire absence of ebullition at the wall and the heat passes through the refrigerant liquid film, by conduction, to its inner surface, from which vaporization occurs in a quantitative ratio to the rate of the heat conducted through the liquid. In this manner, we eliminate the periodic generation of dry spots at the internal wall surface and thereby get the greatest efficiency.

In designing the spiral passage for the results immediately above outlined, we must take into consideration the specific gravity of the various refrigerants, their temperature-pressure relationships and the velocity of the generated vapor in its passage through the conduit.

In actual practice, we have found out, that which is rather commonly known in the refrigerating art, namely that the different refrigerants, commonly used, have widely different characteristics, which affect their flow characteristics through a conduit. For instance, the relative specific gravities are, for ammonia liquid 0.63, for methyl chloride liquid 1.0, for sulphur dioxide liquid 1.4 and for freon liquid 1.4. With these widely varying specific gravities, it is evident that there must be a minimum rotation, of the liquid, imparted by the vapor velocity and the pitch of the spiral ribbon; the minimum rotation increasing with increase of specific gravity of the refrigerant liquid and vice versa, in order to have the refrigerant liquid hug the inner wall of the conduit at the sides and top.

The vapor densities of these refrigerants are relatively as follows: ammonia 0.6, methyl chloride 1.0, sulphur dioxide 0.8 and freon 3.0.

The relative vapor volumes which must be circulated to produce a given unit of refrigeration are, for ammonia 0.5, for methyl chloride 1.0, for sulphur dioxide 1.4 and for freon 0.9.

The situation becomes further complicated when we consider the fact that variations in specific heat and latent heat of evaporation exist as between one refrigerant liquid as compared with another.

Upon an analysis of the situation, it would appear that the proper use of the invention with cooling units of widely different capacities operating with the various commonly used refrigerants, as named, or any given capacity cooling unit to use these various refrigerants, would involve such a multiplicity of conduit sizes as to make the invention commercially impractical, but using conduit tubing of such sizes as are generally used for present day cooling unit construction we have found that the increased efficiency, due to the spiral baffling, lies within certain limits of the vapor velocity in the cooling unit conduit. The velocity limits are, for ammonia 250 feet per minute as a minimum and 5,000 feet per minute as a maximum, for methyl chloride 400 feet per minute as a minimum and 4,000 feet per minute as a maximum, for sulphur dioxide 550 feet per minute as a minimum and 3,000 feet per minute as a maximum and for freon 500 feet per minute as a minimum and 2,800 feet per minute as a maximum.

The minimum vapor velocity limits are those which will just maintain the respective refrigerant liquids in contact with the cooling unit conduit inner wall. Velocities below the minimum will not maintain its respective refrigerant liquid in contact with the upper inner wall of the conduit, and, therefore, the full benefits of the invention cannot be realized.

The maximum vapor velocity limits are those which, for their respective refrigerants, produce a sufficient pressure drop, between the inlet and the outlet of the cooling unit, with its consequent decrease of cooling efficiency, so as to practically counterbalance the increased efficiency due to the spiral baffling in the conduit.

From the above, it is readily apparent that the efficient use of spiral baffling involves the use of vapor velocities above the minimum given for a particular refrigerant. It is further evident that the maximum velocities should never be approached except in the case of necessity.

If an analysis of a cooling unit conduit, in which a spiral baffle is to be used, reveals that the vapor velocity is approaching the maximum given for the particular refrigerant to be used, recourse should then be had to the employment of manifolds as shown in order to sufficiently divide the conduit circuits so as to decrease the vapor velocity.

We claim:

1. In a finned conduit type cooling unit, the combination of a spiral passage adjacent the internal walls of the conduit, a plurality of conduit series circuits manifolded to a single refrigerant inlet and a single refrigerant outlet, and end means to maintain the alignment of the various circuits.

2. In a finned conduit type cooling unit, the combination of a spiral passage adjacent the internal walls of the conduit, a plurality of conduit series circuits manifolded to a single refrigerant inlet and a single refrigerant outlet, and end means to maintain the alignment of the various circuits, the said end means having openings engaging various portions of the conduits comprising the circuits.

3. In a refrigerating system, the combination of a conduit for the circulation of a refrigerant fluid partly in liquid phase and partly in vapor phase inside of the said conduit, in which heat flows from the outside to the inside of the said conduit through the walls thereof, means to maintain the liquid in contact with the conduit wall at a greater pressure than the equivalent saturated vapor temperature-pressure at the conduit inner wall surface temperature, the said means comprising a spiral passage adjacent the conduit inner wall, which induces a rotation of the liquid during its circulation through the conduit at sufficient velocity to centrifugally generate the additional pressure, a plurality of said conduits being connected in parallel between manifolds to limit the pressure drop between the refrigerant fluid inlet and outlet.

RICHARD W. KRITZER.
ANTHONY F. HOESEL.